United States Patent [19]

Danesi

[11] Patent Number: 4,617,125
[45] Date of Patent: Oct. 14, 1986

[54] SEPARATIONS BY SUPPORTED LIQUID MEMBRANE CASCADES

[75] Inventor: Pier R. Danesi, Clarendon Hills, Ill.

[73] Assignee: The United States of America as represented by the United States Department of Energy, Washington, D.C.

[21] Appl. No.: 528,510

[22] Filed: Sep. 1, 1983

[51] Int. Cl.$^4$ ............................................. B01D 13/00
[52] U.S. Cl. ................... 210/638; 210/642; 210/643
[58] Field of Search ............... 210/638, 643, 642; 423/139

[56] References Cited

U.S. PATENT DOCUMENTS

| | | | |
|---|---|---|---|
| 2,947,688 | 8/1960 | Murphy | 210/638 |
| 3,454,490 | 7/1969 | Wallace | 210/638 |
| 3,718,583 | 2/1973 | Wu et al. | 210/638 X |
| 4,042,496 | 8/1977 | Tsushima et al. | 210/638 X |
| 4,051,230 | 9/1977 | Miyauchi | 423/139 X |
| 4,067,802 | 1/1978 | Cronberg et al. | 210/634 |
| 4,086,163 | 4/1978 | Cahn et al. | 210/638 |
| 4,292,181 | 9/1981 | Li et al. | 210/638 |

*Primary Examiner*—Frank Spear
*Attorney, Agent, or Firm*—William Lohff; James W. Weinberger; Judson R. Hightower

[57] ABSTRACT

The invention describes a new separation technique which leads to multi-stage operations by the use of a series (a cascade) of alternated carrier-containing supported-liquid membranes. The membranes contain alternatively a liquid cation exchanger extractant and a liquid anion exchanger extractant (or a neutral extractant) as carrier. The membranes are spaced between alternated aqueous electrolytic solutions of different composition which alternatively provide positively charged extractable species and negatively charged (or zero charged) extractable species, of the chemical species to be separated. The alternated aqueous electrolytic solutions in addition to providing the driving force to the process, simultaneously function as a stripping solution from one type of membrane and as an extraction-promoting solution for the other type of membrane. The aqueous electrolytic solutions and the supported liquid membranes are arranged in such a way to provide a continuous process which leads to the continuous enrichment of the species which show the highest permeability coefficients. By virtue of the very high number of stages which can be arranged, even chemical species having very similar chemical behavior (and consequently very similar permeability coefficients) can be completely separated. The invention also provide a way to concentrate the separated species.

17 Claims, 1 Drawing Figure

SEPARATIONS BY SUPPORTED LIQUID MEMBRANE CASCADES

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention relates to the separation of one or more chemical species present in an aqueous solution and more particularly to the selective separation using a series of supported liquid membranes. The separation of one or more chemical species present in an aqueous solution is very important in a variety of industrial operations. Such species include metal containing ions, neutral complexes and isomers or isotopes of the same chemical elements. Separations of these species are often associated with the extraction of valuable, toxic or radioactive metals in industrial processes and may involve the separation of toxic metals from body fluids during medical treatment. Particularly in separations in aqueous solution of species which are very similar in their physico-chemical properties, the processes may be complex and require repeated stages with replenished extraction liquids to obtain the desired separation. A typical separation process involving multistages or steps is liquid-liquid extraction where a fresh second liquid is utilized repeatedly to achieve a degree of selective separation.

Separation processes have also utilized certain membranes for separating and for concentrating ionic species. In U.S. Pat. No. 3,454,490, cation and anion selective membranes are disclosed in a process where the chemical potential of ionic species on opposite sides of a membrane provides the driving force for the separation. In other processes such as that disclosed in U.S. Pat. No. 4,292,181, an internal phase in a liquid membrane as an emulsion is used to remove a component from an aqueous solution.

Some separation processes have utilized a carrier-containing supported liquid membrane in a single stage operation, where the membrane provides isolation of the aqueous solution from a second aqueous solution. The membrane usually is characterized by a mobile carrier or extractant, such as a long chain alkylphosphoric acid, a phosphoric acid ester or a tertiary amine, dissolved in an organic diluent absorbed on a thin, microporous, polymeric film. The resulting membrane provides a medium which extracts the species from the adjacent solution by forming a membrane soluble complex with the carrier. After extraction into the membrane, the soluble complex diffuses through the membrane and is back extracted into another aqueous solution (stripping solution) of different composition. With two or more aqueous species, the permeability coefficients of each species will determine the relative amounts of the different species which after a given time are extracted from the solution and transferred to the other aqueous solution, present on the opposite side of the membrane. As indicated, this process is limited to single stage separations since it is necessary to change the chemical composition of the stripping solution for continuous operation of the separation process. Therefore, multistage separation processes using carrier-containing supported liquid membranes have not been considered feasible because the composition and/or concentrations of the solutions on opposite sides of the membrane are required to be different.

In fact, chemical species permeate carrier-containing supported liquid membranes, even against their concentration gradient, at the expense of an opposite concentration gradient. This is maintained practically constant during the process either by the use of different and large concentrations (with respect to the species which have to be separated by the membrane) of the same aqueous electrolyte, which is solubilized in the two solutions present on the two opposite sides of the membrane, or by the use of two completely different electrolytes. Moreover, while the first aqueous electrolytic solution, initially containing the species to be separated, must be such to promote extraction into the membrane, the opposite aqueous electrolytic solutions must be such to promote the stripping from the membrane of the species which have initially entered into the membrane. It follows that if another membrane of the same nature, i.e., containing the same carrier at the same concentration, is again contacted with the aqueous electrolytic solution which acted as stripping solution of the species to be separated from the first membrane, no further extraction of these species into this second membrane can take place. Consequently the process stops and the separation of the membrane permeating species can only be operated as a single stage process.

Accordingly, one object of the invention is a multistage process for separating one or more chemical species present in an aqueous solution. Another object of the invention is a multistage process utilizing simple aqueous solutions for the separation. A further object of the invention is a continuous multistage separation process. These and other objects will become apparent from the following description.

SUMMARY OF THE INVENTION

Briefly, the invention is directed to multistage apparatus and multistage separation process utilizing a series of differing and alternating supported liquid membranes between compartments containing different and alternating aqueous solutions of electrolytes to extract one or more chemical species from an aqueous solution. In the process, the supported liquid membranes are alternated between membranes containing liquid cation exchangers and liquid anion exchangers or neutral extractants as carriers. For convenience, the extractants may be defined as Type I or Type II compositions with respect to the presence or absence in their molecules of a positive ion (i.e., $H^+$ or $Na^+$) which can be exchanged for another positive ion present in the aqueous solution in contact with the membrane. Aqueous electrolytic solutions are spaced between the membranes and act as stripping solutions to extract one or more species from one adjacent membrane while providing a source of one or more modified species for the next adjacent membrane. By the use of one or more combinations of supported liquid membranes, the separation becomes more selective. The chemical species which have to be separated are present in the aqueous electrolytic solutions alternatively as cations, Type I, or anions (or neutral species), Type II, and therefore are capable of being continuously extracted and separated by the use of multiple alternating membranes and aqueous electrolytic solutions. Advantageously, the process may be carried out continuously with only minor adjustments in the stripping solutions or electrolytes since the transport of the chemical species continues across successive membranes. Since each species is associated with a different permeability coefficient, the separation becomes continuously more selective.

A process provides a number of advantages. Little or no contamination of the initial aqueous solution occurs. Little or no adjustment or replacement of the electrolytes or stripping solutions is required for alternating membranes and electrolytes. The process may be carried out continuously. Separations of chemical species such as europium and americium may be carried out to a high degree with a limited number of stages. In the case of isotopes a larger number of stages is required. The concentration of the desired species may be progressively increased to provide a final concentrate in a limited volume of liquid which may be further treated to extract valuable metals or if radioactive, stored as a waste product. The process may also be useful for the selective extraction of metals from body fluids during medical treatment.

DETAILED DESCRIPTION OF THE PREFERRED EMBODIMENT

Figure 1:
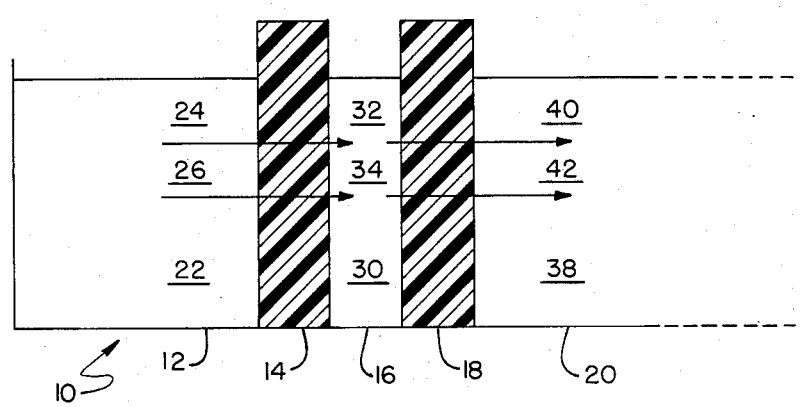
FIG. 1 is a schematic diagram of a process illustrating one embodiment of this invention.

With the invention, apparatus is provided for separating a first chemical species from a second chemical species, both species being contained in a first aqueous electrolytic solution and being of a Type I or Type II composition with respect to the presence or absence of a positive charge on said species, the apparatus comprising: first and second liquid-supported membrane means spaced apart and respectively containing first and second extractants, the extractants being opposite in absorbency with respect to the Type I and Type II compositions with the first extractant having absorbency for the first and second chemical species to form first and second absorbed species, a second aqueous electrolytic solution between and in contact with the first and second membrane means, the second electrolytic solution being capable of stripping at least a portion of the first and second absorbed species and respectively form third and fourth chemical species of the Type II composition, the second extractant having absorbency for the third and fourth chemical species to form third and fourth absorbed species, at least one of the first and second extractants having greater selectivity towards the first or third chemical species to provide separation, the third and fourth absorbed species being at least partially removable by a third aqueous electrolytic solution to form fifth and sixth chemical species of the Type I composition.

The inventive process provides a means for separating a first chemical species from a second chemical species, both species being contained in first aqueous electrolytic solution having a common characteristic identified as a Type I composition with respect to the presence or absence of a positive ionic charge on said species, the method comprising the steps of: providing a first liquid-supported membrane containing a first extractant having absorbency towards the first and second chemical species, contacting the first membrane with the first electrolytic solution for a time sufficient to absorb at least a portion of the first and second chemical species to form first and second absorbed species, providing a second aqueous electrolytic solution capable of stripping at least a portion of the first and second absorbed species from the first membrane to form third and fourth chemical species being a Type II composition opposite to Type I composition, contacting the second aqueous electrolytic solution with the first membrane to strip said absorbed species and form said third and fourth chemical species of the Type II composition, providing a second liquid-supported membrane containing a second extractant having absorbency towards the third and fourth chemical species, and contacting the second membrane with the second aqueous electrolytic solution containing the third and fourth chemical species for a time sufficient to form third and fourth absorbed species at least one of the first and second extractants having greater selectivity towards the first or third chemical species to provide separation of the species.

The process and associated apparatus of the invention are useful for separating chemical species in a variety of operations. Valuable metals such as platinum and palladium, or strategic metals such as cobalt and chromium may be separated by the inventive process. Radioactive species in aqueous solutions related to nuclear test or power facilities may also be separated by the process. Isotopes of chemical elements, such as $^{235}U$ and $^{238}U$ or $^6Li$ and $^7Li$, may also be separated. In addition, the process may also be used to separate one or more species and particularly metals from body fluids during medical treatment.

The invention utilizes a series of alternating liquid membranes and alternating aqueous electrolytic solutions to continuously extract one or more metals through alternating liquid membranes containing liquid cation or anion exchangers or neutral extractants as carriers. In the process, the aqueous electrolytic solutions are spaced between the membranes and act as stripping solutions to extract a first chemical species and more usually first and second chemical species which preferably are metallic ions from one adjacent membrane while providing a source of third and fourth chemical species for the next adjacent membrane. By the use of one or more pairs of membranes, the separation becomes more selective.

FIG. 1 provides an illustration of one embodiment of the invention. As illustrated, housing 10 includes first compartment 12, first membrane 14, second compartment 16, second membrane 18, and third compartment 20. First compartment 12 contains a first electrolyte 22 which usually is an aqueous solution of one or more chemical species in a dilute solution of $1 \times 10^{-2}$ moles/liter or less. With respect to a process involving the separation of the two transplutonium elements curium ($Cm^{3+}$) and californium ($Cf^{3+}$) as first and second chemical species, the first membrane 14 contains a liquid cation exchanger as a carrier and serves to extract curium and californium from aqueous electrolytic solution 22 to form first and second absorbed species in a ratio according to their permeability coefficients. Aqueous electrolytic solution 30 serves as a stripping solution to remove curium and californium from membrane 14 and provides concentration 32 and 34 of the metal ions as third and fourth chemical species. In a similar manner, membrane 18, containing a neutral extractant as carrier, and aqueous electrolytic solution 38 provide third and fourth absorbed species and concentrations 40 and 42 of metals as fifth and sixth chemical species in third compartment 20.

As identified by $SLM_A$ for the first membrane, aqueous electrolytic solution A for the first aqueous electrolytic solution, and $SLM_B$ for the second membrane, a representative process as illustrated in FIG. 1 may proceed as follows for the selective separation of curium and californium.

The curium may be present in aqueous electrolytic solution A as a cation, $Cm^{3+}$, and the membrane containing the liquid cation exchanger as carrier $SLM_A$ acts to extract the cation as follows:

$$Cm^{3+} + 3(HSLM_A) \rightarrow (SLM_A)_3 Cm + 3H^+$$

Aqueous electrolytic solution A contains $H^+$ ions at low concentration and no complexing anions for $Cm^{3+}$. At the interface between $SLM_A$ and electrolyte B, the following reversal occurs:

$$(SLM_A)_3 Cm + 3H^+ \rightarrow 3(HSLM)_A + 3\ Cm^{3+}$$

At the interface between aqueous electrolytic solution B and the membrane containing a neutral extractant as carrier, $SLM_B$, the following extraction occurs:

$$Cm^{3+} + 3NO_3^- + SLM_B \rightarrow (SLM_B)\ Cm(NO_3)_3$$

Aqueous electrolytic solution B contains both $H^+$ and $NO_3^-$ ions at suitable concentrations. At the next interface between $SLM_B$ and aqueous electrolytic solution A, the following occurs:

$$SLM_B Cm(NO_3)_3 \rightarrow SLM_B + Cm^{3+} + NO_3^-$$

A similar process occurs for californium. Since the various equilibrium constants of the chemical reactions involved in the process of curium and californium are different, the concentration ratio of the two species in the third compartment will be different from their concentration ratio in the first one. This fact can be exploited to perform a multistage process leading to the complete separation of the two elements.

As indicated, the aqueous solutions are relatively simple in content and require little change to provide a source of the various components to form the desired anions, cations or neutral species.

The arrangement and selection of the supported liquid membranes with respect to the first aqueous electrolytic solution is such to provide a favorable medium for the extraction of the aqueous species into the first membrane $SLM_A$. The aqueous electrolytic solution B (FIG. 1) serves to strip the extracted species from the $SLM_A$ and to promote a new extraction of the species into the second membrane $SLM_B$. The third aqueous electrolytic solution C (similar to aqueous electrolytic solution A) is used following the second SLM to strip the species from that SLM while promoting again the extraction by a SLM identical to the first one.

If the first membrane contains a liquid cation exchange as a carrier or extractant, the first aqueous electrolytic solution generally consists of a solution of a chemical compound with no complexing properties for the species to be separated and has only a moderate acidity. In this way, in the case of metal cations, the positively charged aqueous species can enter the membrane. In turn aqueous electrolytic solution B consists of a solution of a chemical compound which can form anionic or neutral complexes with the species to be separated and has a high acidity. The stripping of the extracted species from the first membrane is then promoted by the aqueous complex formation of said species and by the high acidity of the solution. At the same time aqueous electrolytic solution B promotes the extraction of the species into the second membrane which contains in this case a liquid anion exchanger or a neutral extractant as carrier. Aqueous electrolytic solution C (similar to electrolyte A except for the various species) can be used again to strip out the species extracted into the second membrane. The driving force to the process is provided by the different composition of aqueous electrolytic solutions A and B which stay practically unchanged when they are present in large excess with respect to the permeating species. Sequential extraction of various species provides a continuous separation of said species. By appropriate choice of the volumes of the various aqueous solutions, separation and concentration of the species can also be obtained.

The process may be carried out at temperatures in the order of about 0°–80° C. and preferably about the ambient temperature. The amount of species separated will depend on the time of extraction, the number of stages, and the type of multistage operation such as for instance nonrecycling, recycling or two-dimensional cross-flow cascades. Selection of the SLMs and the nature of the permeating species as well as the type of aqueous electrolytes will determine the permeability coefficients. Suitable electrolytes for promoting extraction into SLMs containing liquid anion exchanger or neutral extractants as carriers generally should be salts, acids or bases containing an anion which can form neutral or negatively charged complexes with the aqueous species which have to permeate the membrane. Suitable electrolytes for promoting extraction into SLMs containing liquid cation exchangers as carriers should be salts or acids which do not form neutral or negatively charged complexes with the aqueous species which have to permeate the membrane and should have only moderate acidity. The first membrane $SLM_A$, can be a membrane containing a liquid cation exchanger as membrane carrier. Typical liquid cation exchangers are long chain alkyl sulfonic, carboxylic, phosphoric, phosphonic, phosphinic acids, beta-diketones, hydroxyoximes and the like. The second SLM ($SLM_B$), can be a membrane containing a liquid anion exchanger or neutral extractant as membrane carrier. Typical liquid anion exchangers and neutral extractants are long chain alkylamines and their salts, phosphoric acid esters, phosphine oxides, bifunctional neutral extractants such as dialkyldiakylcarbamoylmethyl phosphonate, phosphinate or phosphine oxide. Between the two membranes, the aqueous electrolytic solution B is sandwiched as illustrated in FIG. 1. The order of the membranes, their composition and the composition of the sandwiched aqueous electrolytic solution B are chosen according to the chemistry of the aqueous solution containing the species to be separated. The system $SLM_A$-aqueous electrolytic solution B-$SLM_B$ shown in FIG. 1 represents a composite SLM. A multistage separation of the aqueous species 24 and 26, initially present in the aqueous electrolytic solution 22 the first compartment, can now be performed since they will be transferred in different amounts, to the third compartment 20. The amounts of 24 and 26 transferred will be a function of their permeability coefficients, $P(M_1)$ and $P(M_2)$, through the composite SLM. The process can be therefore repeated as many times as necessary to separate species $M_1$ and $M_2$.

With two or more chemical species, the permeability coefficients of such species will determine the relative amounts of the different species which are extracted from the solution and transferred to the other aqueous solution, present on the opposite side of the membrane. With the use of alternated cation and anion (or neutral) liquid ion exchange SLMs and appropriate aqueous electrolytes, a process is provided to continually separate an aqueous species from other species present in an initial feed chamber. In some instances, only one of the membranes has selectivity with respect to the two chemical species to be separated. However, a plurality of the selective membranes may be used in combination with the membranes of the opposite type to provide the desired separation.

The volume of compartment B can be reduced to a thin slab of aqueous solution, having approximately the same thickness of $SLM_A$ and $SLM_B$, by absorbing the solution of compartment B on a thin hydrophobic polymeric porous membrane. The process occurs in the same way as described before and the system $SLM_A$-aqueous electrolytic solution B-$SLM_B$ is better visualized as a composite-alternated-SLM.

In the case of two isomers or isotopes of the same chemical species, the values of the permeability coefficients will be very similar and a single stage will provide very little separation. Nevertheless also in this case, by suitably multiplying the number of stages, very clean separations can be achieved.

The concentration of metals 40 and 42 as function of time in the third compartment, when the volume of each compartment is the same, may be obtained from the following equation $$C = C_o \left[ 1 + \frac{K_B \cdot e^{-K_A \cdot t} - K_A \cdot e^{-K_B \cdot t}}{K_A - K_B} \right]$$

where $C_o$ = initial concentration in compartment I
$K = P$ (membrane area/volume)
$P$ = permeability coefficient
$t$ = time.

Whenever the volume of compartment B is very small as compared to that of the aqueous electrolytic solution A and $SLM_A$ and $SLM_B$ are properly chosen, the composite membrane behaves as a single membrane, characterized by a total permeability coefficient equal to $P(SLM_A)$. In this case the concentration of a species in the N-th stage, $C_N$, may be obtained from the equation $$C_N = C_o \cdot \frac{(K \cdot t)^{N-1}}{(N-1)!} e^{-Kt}$$

where $K = K (SLM_A)$.

The following examples are provided for illustrative purposes and are not intended to be restrictive as to the scope of the invention:

EXAMPLE I

A conceptual process to separate $Eu^{3+}$ from a solution containing $Am^{3+}$ and $Eu^{3+}$ utilizing supported liquid membranes and aqueous electrolytic solutions arranged as illustrated in FIG. 1 is described. In the process, a feed solution containing $Am^{3+}$ and $Eu^{3+}$, at low concentrations in about HCl $6 \times 10^{-2}$M and KCl 0.14M is provided in the first compartment or compartment A of FIG. 1. The first supported liquid membrane ($SLM_A$) is a 0.1 F solution of a di(2-ethyl hexyl) phosphoric acid in n-dodecane absorbed on a microporous polymeric film of polypropylene. The second compartment or compartment B of FIG. 1 contains an aqueous solution 2M $KNO_3$ and 0.75M $H_2SO_4$. The second supported liquid membrane ($SLM_B$) is a 0.5 F solution of tri-n-octylphosphine oxide in decalin absorbed on a microporous polymeric film of polypropylene. The third compartment contains an aqueous solution of $6 \times 10^{-2}$M HCl and 0.14M KCl.

Since the permeability coefficients of $Am^{3+}$ and $Eu^{3+}$ through the system are different, their separation is possible. The permeability coefficients of $Eu^{3+}$ and $Am^{3+}$ through $SLM_A$ are $2.9 \times 10^{-3}$ cm/sec and $3.6 \times 10^{-4}$ cm/sec respectively. The volumes of the solutions are 150 cm$^3$ in the first and third compartment. The volume of the solution in the second compartment is 15 cm$^3$ and the effective membrane area is 8.1 cm$^3$.

The rate constants, K, for the permeation of $Eu^{3+}$ and $Am^{3+}$ through the composite membrane of $SLM_A$-aqueous electrolytic solution B-$SLM_B$ were estimated to be $6.6 \times 10^{-5}$ sec$^{-1}$ and $2.6 \times 10^{-6}$ sec$^{-1}$, respectively. After about $70 \times 10^3$ sec, 99% of $Eu^{3+}$ is present in the third compartment. Only 16% of the initial $Am^{3+}$ accompanies $Eu^{3+}$ in the third compartment. The second compartment contains essentially very low amounts of $Eu^{3+}$ and $Am^3$. The concentration ratio between $Eu^{3+}$ and $Am^{3+}$ in the third compartment has increased from about 1.0 to about 6.2. Since the combination $SLM_A$-electrolytic solution B-$SLM_B$-aqueous electrolytic solution A may be repeated many times, the separation between $Eu^{3+}$ and $Am^{3+}$ may become essentially complete in few steps. By using a volume for the third compartment of 15 cm$^3$ the concentration of $Eu^{3+}$ is increased ten times with respect to that in the first compartment before the separation process took place. In this case a separation and a concentration are simultaneously obtained.

EXAMPLE II

In a process for separating Cd(II) from Z(II), a feed solution or first aqueous electrolytic solution 2M NaCl and 0.1M HCl is provided in a first compartment. The first supported liquid membrane ($SLM_A$) is a $3 \times 10^{-2}$M solution of tri-dodecyl ammonium chloride (TLAHCl) in triethylbenzene absorbed on a microporous polymeric film of polypropylene. The second compartment of FIG. 1 contains an aqueous solution 0.1M $CH_3COOH$ (acetic acid) and 0.1 M $CH_3COONa$ (sodium acetate). The second supported liquid membrane ($SLM_B$) is a 0.1 F solution of di (2-ethyl hexyl) sodium phosphate (NaDEHP) in n-dodecane absorbed on a microporous polymeric film of polypropylene. The third compartment contains an aqueous solution 2M NaCl and 0.1 HCl. Since the permeabilities of Zn(II) and Cd(II) through the system are different, their separation is possible. The permeability coefficients of Cd(II) and Zn(II) through the first membrane are $3.0 \times 10^{-3}$ cm/sec and $1.0 \times 10^{-3}$ cm/sec respectively. The permeability coefficients of Cd(II) and Zn(II) through the second membrane are $2 \times 10^{-3}$ cm/sec for both metal species. The volumes of the solutions are about 150 cm$^3$ in the first and third compartment. The volume of solution in the second compartment is about 15 cm$^3$ and the effective membrane area is about 8.1 cm$^3$. The rate constants, K, for the permeation of Cd(II) and Zn(II) through the composite membranes $SLM_A$-aqueous electrolytic solution B-$SLM_B$ are estimated to be $1.6 \times 10^{-4}$ sec$^{-1}$ and $5.5 \times 10^{-5}$ sec$^{-1}$ respectively.

After 15,000 sec., approximately 91% of the Cd(11) is present in the third compartment accompanied by approximately 56% of Zn(II). The second compartment contains essentially very low concentrations of Zn and Cd. The concentration ratio of Cd(II) to Zn(II) in the third compartment has increased from 1.0 to 1.6. Since the combination $SLM_A$-aqueous electrolytic solution B-$SLM_B$ may be repeated many times, the separation between Cd and Zn may become essentially complete. For example, by repeating the step ten more times, after $8.9 \times 10^4$ sec, the final compartment will contain approximately 90% of the initial Cd together with only approximately 3% of Zn. The concentration ratio has now increased from 1 to 30. Also in this case, using a much smaller volume for the final compartment simultaneous separation and concentration are simultaneously obtained.

EXAMPLE III

In a process for separating three rare earth metals, the three rare earths Ce(Cerium), Nd(Neodymium), and Sm(Samarium) are initially present at the same (low) concentration in a solution 3M $HNO_3$ in the first compartment of FIG. 1. The first supported liquid membrane ($SLM_A$) is a 0.4 M solution of n-octyl (phenyl)-N,N-diisobutylcarbamoylmethyl phosphine oxide in toluene absorbed on a microporous polymeric film of polypropylene. The second compartment of FIG. 1 contains an aqueous solution of $10^{-3}M$ HCl. The second supported liquid membrane ($SLM_B$) is a 0.1F solution of di(2-ethyl hexyl) phosphoric acid (HDEHP) in n-dodecane absorbed on a microporous polymeric film of polypropylene. The third compartment contains an aqueous solution 3M $HNO_3$. Since the permeabilities of Ce, Nd and Sm through the system are different their separation is possible. The permeability coefficients of Ce, Nd and Sm through the first membrane are $8.6 \times 10^{-4}$ cm/sec, $1.2 \times 10^{-3}$ cm/sec and $1.7 \times 10^{-3}$ cm/sec respectively. The permeability coefficients of Ce, Nd and Sm through the second membrane are $2 \times 10^{-3}$ cm/sec for all three rare earths. The volumes of solution in each compartment and the effective membrane area are the same as in the previous examples. The rate constant, K, for the permeation of Ce, Nd and Sm through the composite membrane $SLM_A$-aqueous electrolytic solution B-$SLM_B$ are estimated to be $4.6 \times 10^{-5} sec^{-1}$, $6.7 \times 10^{-5} sec^{-1}$ and $9.1 \times 10^{-5} sec^{-1}$ respectively. After 26,000 seconds approximately 90% of Sm, 81% of Nd and 68% of Ce are present in the third compartment. By repeating the combination $SLM_A$-aqueous electrolytic solution-$SLM_B$ ten more times after $1.6 \times 10^5$ sec., the final compartment will contain 91.4% of Sm, 63% of Nd and 21% of Ce. Since the combination $SLM_A$-aqueous electrolytic solution B-$SLM_B$ may be repeated many times, the separation between Sm, Nd and Ce may become essentially complete. Also in this case by using a very small volume for the final compartment separation and concentration is simultaneously achieved.

The foregoing description of embodiments of the invention has been presented for purposes of illustration and description. It is not intended to be exhaustive or to limit the invention to the precise form disclosed. Other modifications and variations are possible in light of the above teaching.

The embodiments of the invention in which an exclusive property or privilege is claimed are defined as follows:

1. Apparatus for selectively separating a first chemical species from a second chemical species, both species being contained in a first aqueous electrolytic solution and being of a Type I or Type II composition with respect to the presence or absence of a positive ionic charge on said species, the apparatus comprising:

a combination of first and second supported liquid membranes arranged in a series of alternately spaced-apart membranes for sequential transfer of said species through said membranes in a first direction, and respectively containing first and second extractants, the extractants being opposite in extractancy with respect to the Type I and Type II compositions with the first extractant being capable of extracting the first and second chemical species into the first supported liquid membrane to form first and second extracted species, one of the extractants being a cation exchanger and the other extractant being an anion exchanger or a neutral extractant, a second aqueous electrolytic solution between and in contact with the first and second membrane means, the second electrolytic solution being capable of stripping the first and second extracted species and respectively form third and fourth chemical species of the Type II composition, the second extractant being capable of extracting the third and fourth chemical species into the second supported liquid membrane to form third and fourth extracted species, at least one of the first and second extractants having greater selectivity towards the first or third chemical species to provide separation, the third and fourth absorbed species being removable by a third aqueous electrolytic solution to form fifth and sixth chemical species of the Type I composition.

2. The apparatus of claim 1 including the third electrolytic solution.

3. The apparatus of claim 1 wherein the chemical species are metallic species.

4. The apparatus of claim 3 wherein said series includes a plurality of first and second supported liquid membranes, and the first and third extractants have different permeability coefficients for the first and second and third and fourth metallic species.

5. The apparatus of claim 1 wherein the first and second membrane means each include a liquid containing the extractant supported on a porous polymeric membrane.

6. The apparatus of claim 1 wherein said series includes at least four combinations of alternating first and second supported liquid membranes and second and third electrolytic solutions.

7. The apparatus of claim 1 wherein the first and second extractants are di(2-ethyl hexyl) phosphoric acid and tri-n-octylphosphine oxide, respectively, with the membrane being porous polypropylene, the second solution contains a nitrate anion for complexing with the first and second extracted species to form said third and fourth chemical species and the third solution contains HCl and KCl.

8. The apparatus of claim 7 wherein the first and second species are europium and americium.

9. The apparatus of claim 1 wherein the first and second extractants are tri-dodecyl ammonium chloride and di(2-ethyl hexyl) sodium phosphate with the membrane being porous polypropylene, the second aqueous electrolytic solution is an acetic acid solution to form the third and fourth chemical species as cations and the third solution contains NaCl and HCl.

10. The apparatus of claim 1 wherein the first and second extractants are n-octyl (phenyl)-N, N-di-isobutyl-carbamoylmethyl phosphine oxide and di(2-ethyl hexyl) phosphoric acid with the membrane being porous polypropylene and the second aqueous electrolytic solution is a hydrochloric acid solution to form the third and fourth chemical species as cations.

11. A method for selectively separating a first chemical species from a second chemical species, both species being contained in first aqueous electrolytic solution and having a common characteristic identified as a Type I or Type II composition with respect to the presence of absence of a positive ionic charge on said species, the method comprising the steps of:
providing a first supported liquid membrane containing a first extractant being capable of extracting the first and second chemical species into the first supported liquid membrane,
contacting the first membrane with the first aqueous electrolytic solution for a time sufficient to extract at least a portion of the first and second chemical species to form first and second extracted species,
providing a second aqueous electrolytic solution capable of stripping at least a portion of the first and second extracted species from the first membrane to form third and fourth chemical species being a Type II composition opposite to Type I composition,
contacting the second electrolytic solution with the first membrane to strip said extracted species and form said third and fourth chemical species of the Type II composition,
providing a second supported liquid membrane containing a second extractant being capable of extracting the third and fouth chemical species into the second supported membrane, one of the extractants being a cation exchanger and the other extractant being an anion exchanger or a neutral extractant, and
contacting the second membrane with the second aqueous electrolytic solution containing the third and fourth chemical species for a time sufficient to form third and fourth extracted species, at least one of the first and second extractants having greater selectivity towards the first or third chemical species to provide separation of the species, the contacting of the first and second species with the first and second membranes being carried out sequentially.

12. The method of claim 11 including the steps of providing a third aqueous electrolytic solution capable of stripping at least a portion of the third and fourth extracted species and form fifth and sixth chemical species of the Type I composition, and
contacting the third aqueous electrolytic solution with the second membrane having said third and fourth extracted species for a time sufficient to strip said extracted species and form said fifth and sixth chemical species.

13. The method of claim 12 including the steps of providing a plurality of said combination of first membrane. second aqueous electrolytic solution, and second membrane following the third aqueous electrolytic solution and sequential providing contact between said third electrolyte, said additional first membrane, second aqueous electrolytic solution, and second membrane for the further seelctive separation of the first chemical species and its modified forms.

14. The method of claim 12 wherein the first and second chemical species are metal containing species, the first and second aqueous electrolytic solutions are acid solutions with the first extractant removing the first and second chemical species as cations and the second aqueous electrolytic solution containing an anion for complexing with said cations, and the third aqueous electrolytic solution strips the third and fourth absorbed species as cations.

15. The method of claim 14 wherein the first and second extractants are di(2-ethyl hexyl) phosphoric acid and tri-n-octylphosphine oxide, respectively, and the first metal is americium and the second metal is europium.

16. The method of claim 12 wherein the first and second chemical species are metal-containing species, the first and third aqueous electrolytic solutions contain an anion for complexing with the metal-containing species for extraction by the first extractant and stripping by the third aqueous electrolytic solution, and the second aqueous electrolytic solution strips the metal-containing species from the first extractant as a cation.

17. The method of claim 16 wherein the first and second extractants are tri-dodecyl ammonium chloride and di(2-ethyl hexyl) sodium phosphate and the first metal is cadmium and the second metal is zinc.

* * * * *